(12) United States Patent
Lehr

(10) Patent No.: US 6,425,572 B1
(45) Date of Patent: Jul. 30, 2002

(54) RETRACTABLE, TELESCOPING HANDRAIL FOR RECREATIONAL VEHICLES

(76) Inventor: Marshall H. Lehr, 525 Lehr Pl., Manteca, CA (US) 95336

( * ) Notice: Subject to any disclaimer, the term of this patent is extended or adjusted under 35 U.S.C. 154(b) by 0 days.

(21) Appl. No.: 09/657,768

(22) Filed: Sep. 8, 2000

Related U.S. Application Data
(60) Provisional application No. 60/165,909, filed on Nov. 16, 1999.

(51) Int. Cl.[7] ................................................. B60R 3/02
(52) U.S. Cl. ............................ 256/1; 280/166; 182/127
(58) Field of Search .................... 256/1, 67; 182/96, 182/127; 280/164.1, 166

(56) References Cited

U.S. PATENT DOCUMENTS

| | | | | |
|---|---|---|---|---|
| 2,812,528 A | * | 11/1957 | Odell ............................ | 52/183 |
| 3,401,918 A | * | 9/1968 | Wiese ........................... | 256/59 |
| 3,871,479 A | * | 3/1975 | Pelto ............................ | 182/86 |
| 3,964,215 A | * | 6/1976 | Hartman et al. ............ | 256/67 X |
| 4,006,564 A | * | 2/1977 | Wiese ........................... | 256/65 X |
| 4,029,352 A | | 6/1977 | Evans ........................... | 296/23 |
| 4,216,725 A | * | 8/1980 | Hallam ......................... | 296/152 X |
| 4,261,550 A | | 4/1981 | Gregory ....................... | 256/67 |
| 4,358,125 A | * | 11/1982 | Charles ........................ | 280/250.1 |
| 4,442,921 A | * | 4/1984 | Sherman ...................... | 187/403 |
| 4,720,116 A | | 1/1988 | Williams et al. ............ | 280/166 |
| 5,004,260 A | * | 4/1991 | Smyly, Sr. ................... | 280/414.1 |
| 5,024,420 A | | 6/1991 | Downing ..................... | 256/67 |
| 5,042,612 A | * | 8/1991 | Bennett et al. .............. | 182/1 |
| 5,116,025 A | | 5/1992 | Kiniry .......................... | 256/67 |
| 5,143,324 A | * | 9/1992 | Cornelius et al. .......... | 182/88 X |
| 5,167,298 A | * | 12/1992 | Porter .......................... | 182/187 |
| 5,280,934 A | * | 1/1994 | Monte .......................... | 280/166 |
| 5,397,143 A | * | 3/1995 | Bird ............................. | 280/166 |
| 5,401,135 A | * | 3/1995 | Stoen et al. ................. | 414/546 |
| 6,238,320 B1 | * | 5/2001 | Flanagan ..................... | 482/41 |

* cited by examiner

*Primary Examiner*—Lynne H. Browne
*Assistant Examiner*—Ernesto Garcia
(74) *Attorney, Agent, or Firm*—Lumen Intellectual Property Services

(57) ABSTRACT

A telescoping, retractable handrail for a recreational vehicle automatically extends or retracts when the retractable stairs of the vehicle are extended or retracted. The handrail contains an upper rail pivotally attached at one end to the outer wall of the vehicle and a lower rail pivotally attached at one end to the stairs of the vehicle. The unattached ends of both rails are telescopingly engaged with one another. Preferably, the lower rail telescopes within the upper rail. When the stairs are extended, the lower rail moves downward and outward to extend the rail for use by a person entering the vehicle. The handrail may also contain upper and lower brackets for pivotally attaching the upper and lower rails to the wall and stairs, respectively.

19 Claims, 9 Drawing Sheets

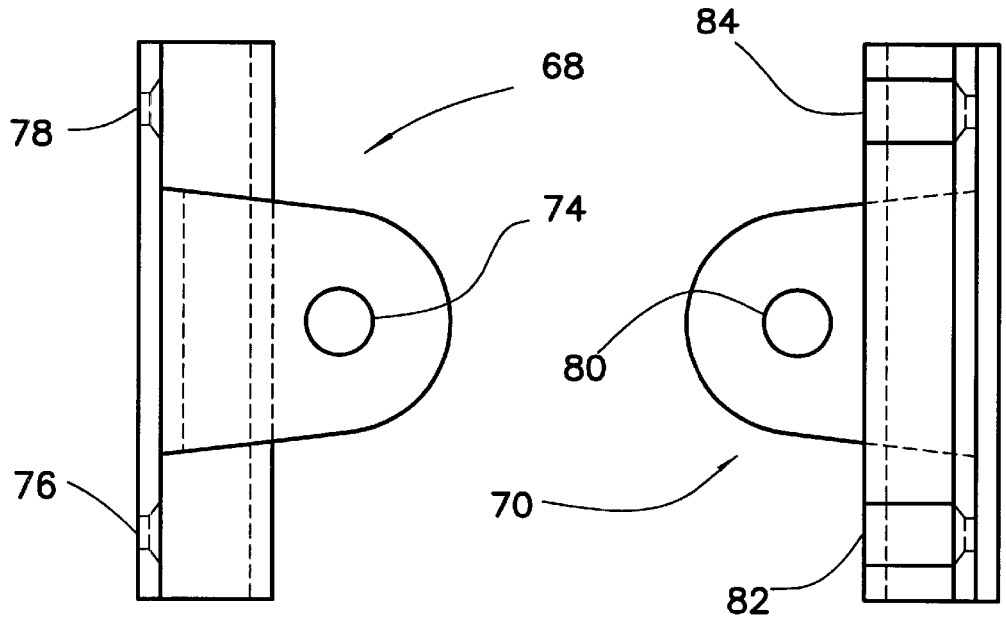
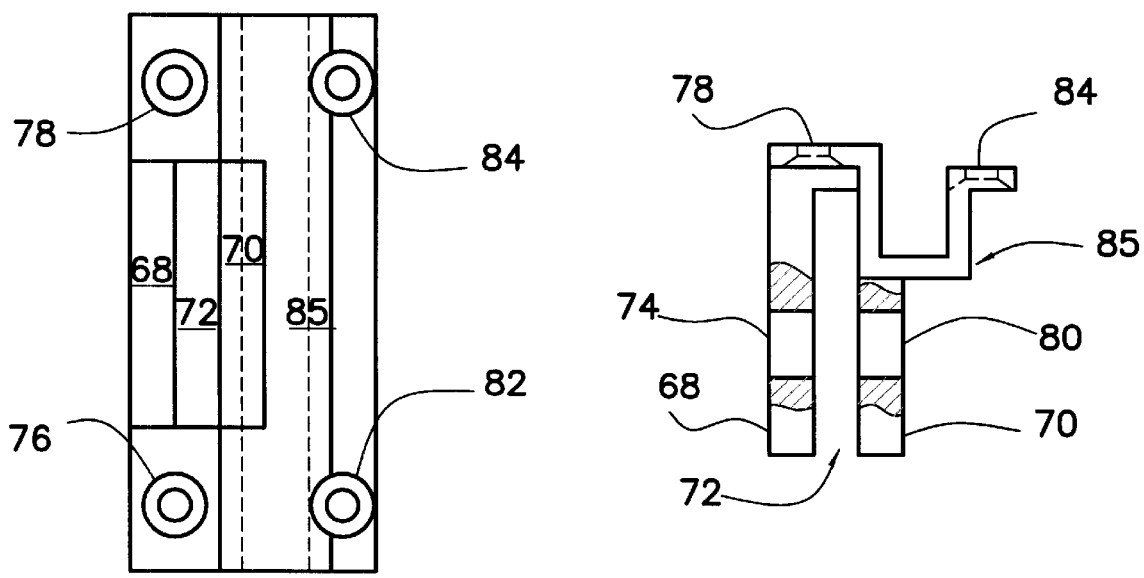
Fig. 5A
Fig. 5B
Fig. 5C
Fig. 5D

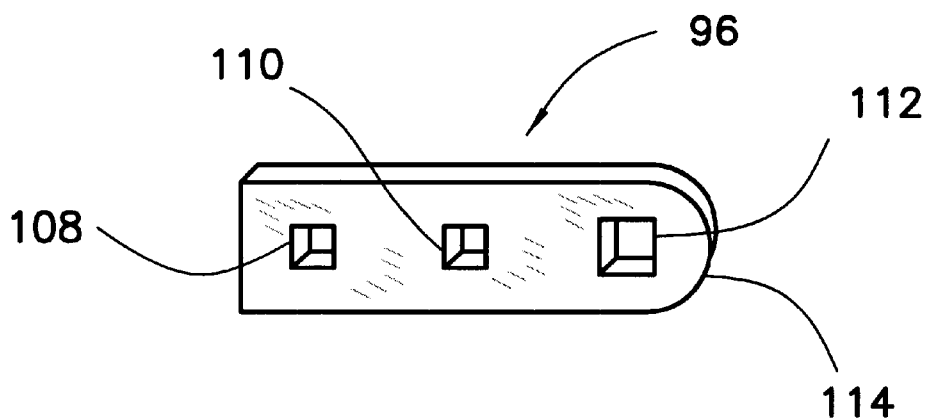
Fig. 8
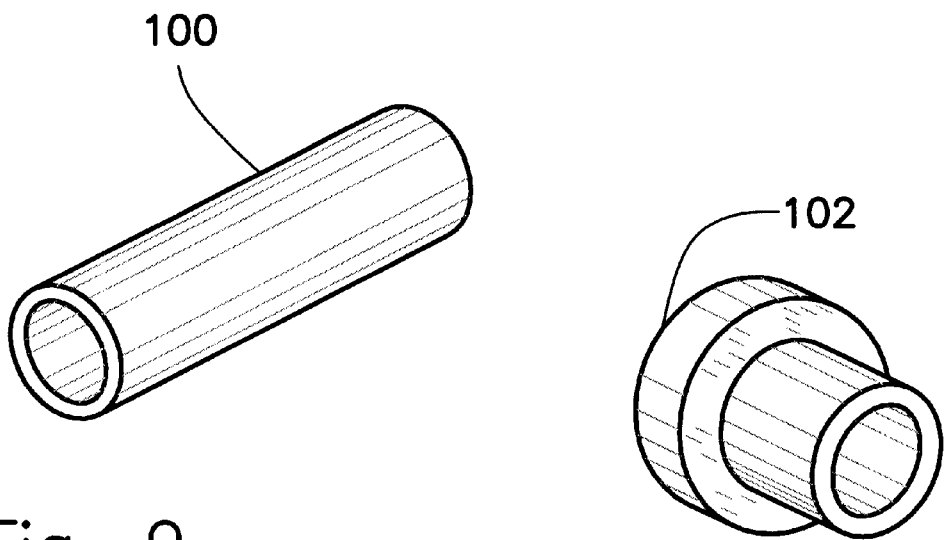
Fig. 9
Fig. 10

RETRACTABLE, TELESCOPING HANDRAIL FOR RECREATIONAL VEHICLES

CROSS-REFERENCE TO RELATED APPLICATIONS

This application claims the benefit of U.S. Provisional Application No. 60/165,909 filed Nov. 16, 1999, which is herein incorporated by reference.

FIELD OF THE INVENTION

This invention relates generally to handrails for stairs and steps. More particularly, it relates to a retractable handrail for use with retractable stairs on recreational vehicles and the like.

BACKGROUND ART

A large segment of the American population owns motor homes, recreational vehicles (RVs), travel trailers, or fifth wheel trailers. These vehicles typically contain side doors located a substantial distance from the ground, with retractable stairs containing two or three steps for entry through the door. The stairs fold underneath the vehicle for travel and are either manually or automatically extended when the vehicle is parked. By their nature, retractable stairs are rather unstable, projecting from the side of the vehicle and providing no lateral support for a person entering the vehicle. A need for a handrail to accompany retractable stairs on recreational vehicles has long been recognized in the art, and numerous designs have been proposed. However, many recreational vehicles are currently sold without handrails, indicating that none of the existing designs are both cost-effective and technically suitable.

Most of the handrails found in the art suffer from two main disadvantages: mechanical complexity and manual extension. A foldable handrail structure is disclosed in U.S. Pat. No. 4,261,550, issued to Gregory. A hollow handrail is connected at one end to a bracket attached to the RV wall. Within the handrail moves a first end of a slide whose second end is connected to a second wall bracket located below the first. The slide moves along the handrail, extending the handrail away from the wall when the slide is at the lower end of the handrail, and folding the handrail toward the wall when the slide moves to the upper end of the handrail. The handrail structure of Gregory must be opened and closed manually, making it awkward to adjust.

A foldable hand rail is disclosed in U.S. Pat. No. 4,029,352, issued to Evans. The hand rail swings away from the camper wall during use and is supported by a strut that extends laterally from the rail. The strut helps to stabilize the hand rail and limit its lateral movement. The hand rail of Evans must be extended manually and is quite mechanically complex, introducing a higher possibility of part malfunction or breakage.

A cantilevered, retractable handrail is disclosed in U.S. Pat. No. 5,116,025, issued to Kiniry. The handrail requires no support post and pivots around its top end to be positioned against the wall or extending away from the wall. As with the rails of Gregory and Evans, the handrail of Kiniry must be manually extended and retracted. It also requires a complicated hinge that can support the handrail in its extended position without requiring a support post.

A foldable handrail assembly is disclosed in U.S. Pat. No. 5,024,420, issued to Downing. The assembly is similar to handrail of Gregory, but contains an additional stabilizer rod. Most importantly, the assembly allows varying placement of its parts to facilitate retrofitting of different designs of trailers. The handrail of Downing is mechanically complex and requires manual retraction.

A storable stairway and platform apparatus for recreational vehicles is disclosed in U.S. Pat. No. 4,720,116, issued to Williams et al. The stairway has scissor linkages for folding the steps into parallel alignment with each other for retraction. The stairway may also be supplied with a foldable banister that is removably attached to a bracket on the RV wall. In order to retract the banister, a pin must be removed from the bracket and the banister folded away from the wall. The banister must be manually removed from and attached to the wall when desired.

There is a need, therefore, for an improved handrail for a recreational vehicle that is mechanically simple, can be added to existing vehicles, and automatically retracts and extends with the stairs.

Objects and Advantages

Accordingly, it is a primary object of the present invention to provide a telescoping handrail that automatically retracts or extends when the stairs of the recreational vehicle are retracted or extended.

It is a further object of the invention to provide a retractable handrail that is mechanically simple and contains few parts, reducing the frequency of necessary maintenance or repair.

It is an additional object of the invention to provide a handrail for recreational vehicles that can easily be added to existing vehicles.

It is another object of the present invention to provide a strong, durable handrail that provides sufficient support while remaining lightweight.

It is a further object of the invention to provide a retractable handrail that is aesthetically appealing, providing a clean, uncluttered look to the outside of the recreational vehicle.

It is an additional object of the invention to provide a retractable handrail that is compact and projects only a few inches from the side of the vehicle when in its retracted position.

Finally, it is an object of the invention to provide a retractable handrail that is inexpensive to manufacture and to purchase.

SUMMARY

These objects and advantages are attained by a retractable handrail for a recreational vehicle (RV) that contains retractable stairs for entry through a door. Extending the stairs causes extension of the handrail, and retraction of the stairs causes retraction of the handrail. The handrail contains an extended upper rail, between two and five feet long, and an extended lower rail, between two and three feet long. The upper rail has a wall end that can be pivotally attached to an outer wall of the vehicle, adjacent to the door, and a bottom end telescopingly engaged with a top end of the lower rail. The lower rail also has a step end that can be pivotally attached to the stairs. Preferably, the lower rail telescopes within the upper rail, but the upper rail may instead telescope within the lower rail. At least one spacer is preferably secured around the lower rail at a location that remains within the upper rail during extension and retraction of the handrail. When the stairs are extended, the lower rail travels in an outward and downward direction, sliding within the upper rail and extending the handrail. Preferably, the handrail is made of metal, and most preferably of steel.

When the handrail is attached to the RV wall and retracted, the step end of the lower rail and the wall end of the upper rail are substantially vertically aligned, and the handrail extends at most six inches from the outer wall of the RV. Preferably, the upper rail is bent to form an obtuse angle, approximately 150°, near the wall end. The angle defines a rail plane, and the handrail is positioned so that the rail plane is perpendicular to the outer wall. The upper and lower rails are preferably both tubular with circular cross section. The upper rail may be connected to the RV via an upper bracket fixed to the outer wall. Similarly, the lower rail may be connected to the RV via a lower bracket fixed to the stairs, either to the side or bottom of the lowest step. The rails are pivotally connected to their respective brackets.

BRIEF DESCRIPTION OF THE FIGURES

FIGS. 5A–5D are left, right, front, and top plan views, respectively, of the upper bracket of FIG. 4.

FIG. 8 is a front perspective view of the side mount bracket of the present invention.

FIG. 9 is a front perspective view of a spacer used in the side mount embodiment of FIG. 7.

FIG. 10 is a side perspective view of a bearing used in the side mount embodiment of FIG. 7.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

The present invention provides a retractable, telescoping handrail for use with a recreational vehicle (RV). As used herein, a recreational vehicle includes any vehicle having retractable stairs for entry into a door, such as a motor home, travel trailer, and fifth wheel trailer. The steps retract for traveling and extend for access to the interior when the vehicle is parked. The present invention may be used with both manually and automatically retractable stairs, and extends or retracts automatically when the stairs are extended or retracted. When the handrail is retracted, it extends only a short distance, such as six inches, from the side of the vehicle. The total width of the vehicle therefore remains within the legal limits for travel.

Figures 1A, 1B:
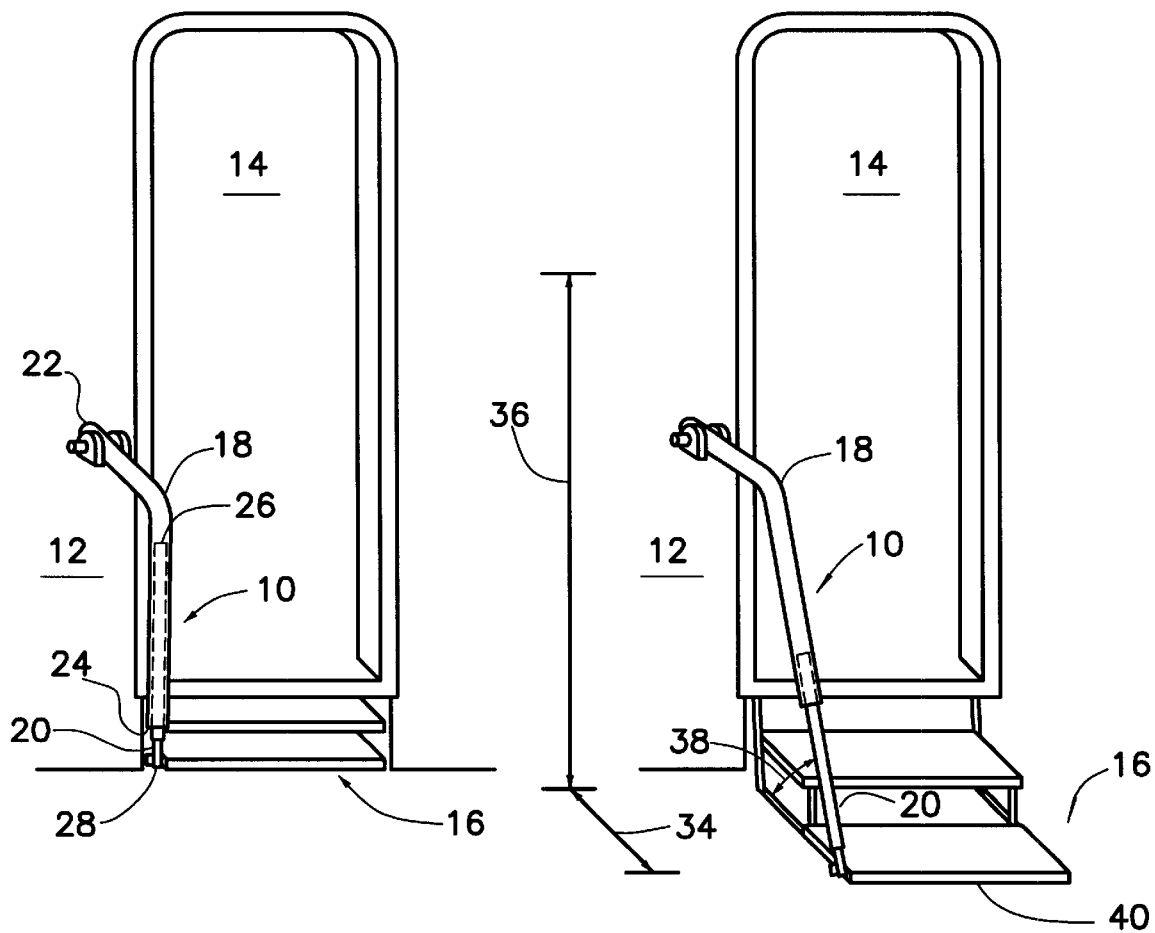
FIGS. 1A–1B illustrate a preferred embodiment of the handrail of the present invention in its retracted and extended positions.

A preferred embodiment of the handrail 10 of the present invention is shown in FIGS. 1A and 1B. FIG. 1A illustrates handrail 10 in its retracted position, and FIG. 1B illustrates handrail 10 in its extended position. Handrail 10 is fixed to the outer wall 12 of a recreational vehicle, adjacent to the doorway 14. Below doorway 14 is a set of retractable stairs 16, shown in a retracted position in FIG. 1A and an extended position in FIG. 1B. Stairs 16 are shown having two steps, but they may have any number of steps. Handrail 10 contains an extended upper rail 18 and an extended lower rail 20 that are telescopingly engaged. Upper rail 18 has a wall end 22 that is pivotally attached to wall 12 and a bottom end 24. Lower rail 20 has a top end 26 and a step end 28 that is pivotally attached to stairs 16. Bottom end 24 of upper rail 18 is telescopingly engaged with top end 26 of lower rail 20. Preferably, lower rail 20 travels within upper rail 18, as indicated by the dotted lines illustrating the portion of lower rail 20 that is inside upper rail 18. However, upper rail 18 may instead travel within lower rail 20. Of course, the relative diameters of the two rails depend upon which travels within the other.

When stairs 16 are extended, handrail 10 pivots away from wall 12 at wall end 22 of upper rail 18. Upper rail 18 and lower rail 20 move away from each other in a telescoping fashion to increase the total length of handrail 10, as illustrated in FIG. 1B. Handrail 10 is preferably mounted so that step end 28 of lower rail 20 is in substantial vertical alignment with wall end 22 of upper rail 18 when handrail 10 is in a retracted position. The substantial vertical alignment is such that no significant lateral forces are applied to any part of handrail 10 white it is being extended.

Figure 2A:
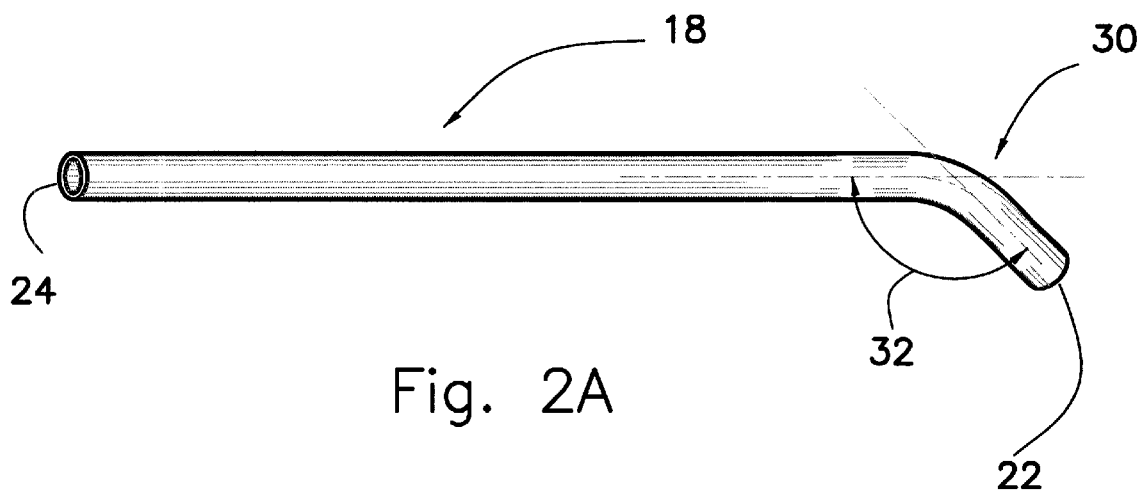
FIGS. 2A–2B show two parts of the upper rail of the handrail of FIGS 1A–12B.
Figure 2B:
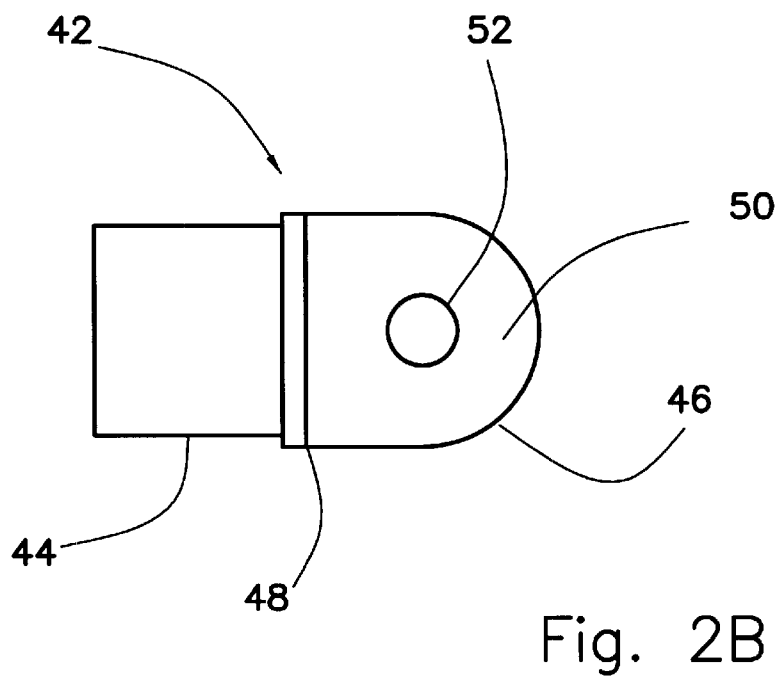

Upper rail 18 is illustrated in more detail in FIGS. 2A and 2B. Upper rail 18 is preferably formed of mild steel tubing with a circular cross section. Preferably, the mild steel tubing has a powder coated stipple finish on its entire outer surface to provide a non-slip grip. However, upper rail 18 may also be made of stainless steel, aluminum, or other metal; plastic; or any other suitable material. Located near wall end 22 is a bend 30 that forms an obtuse angle 32 in upper rail 18. Obtuse angle 32 is preferably approximately 150°, but it may range between 90° and 180°. Referring again to FIG. 1B, note that angle 32, the location of bend 30, and distances 34 and 36 determine the angle 38 that the majority of handrail 10 makes with a lower step 40 of stairs 16. Angle 32 is preferably chosen to provide a comfortable angle 38 and distance 36 while using the minimum amount of material and keeping handrail 10 sufficiently separated from wall 12 when retracted. Bend 30 defines a rail plane containing angle 32, i.e., the plane of the paper of FIG. 2A. This rail plane is preferably perpendicular to wall 12 for the most comfortable use of handrail 10.

FIG. 2B illustrates an endpiece 42 that is inserted into wall end 22 of upper rail 18 to facilitate attachment to a wall bracket. A round part 44 has a circular cross section (or the same shaped cross section as wall end 22) and is inserted into wall end 22 of upper rail 18. Round part 44 has an outer diameter that is slightly smaller than the outer diameter of upper rail 18, so that it can fit snugly within upper rail 18. A flattened part 46 tapers from a circular cross section at location 48 to a flat region 50 that contains a hole 52. A bolt may be inserted through hole 52 to attach wall end 22 of upper rail 18 in a pivotal manner to wall 12 of the RV. When an upper bracket of the present invention (described below) is used, endpiece 42 is inserted into wall end 22 such that flat region 50 is parallel to the rail plane defined by bend 30.

Figure 3:
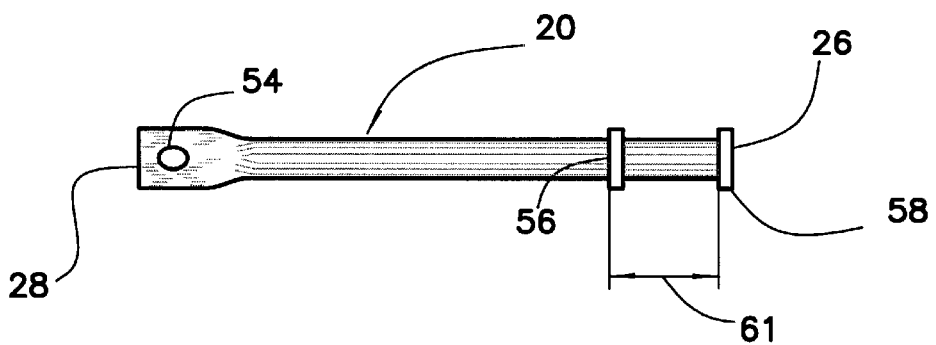
FIG. 3 shows the lower rail of the handrail of FIGS. 1A–1B.

Lower rail 20 is illustrated in more detail in FIG. 3. Lower rail 20 is preferably formed of stainless steel tubing that has a circular cross section. However, it may also be made of aluminum or other metal, plastic, or any other suitable materials. Step end 28 is preferably flattened and contains a hole 54 through which a bearing may be inserted. Step end 28 may be attached to stairs 16 in a pivotal manner via a bolt through this bearing and hole 54. While lower rail 20 is shown straight, it may have any bends deemed necessary and still remain within the scope of the present invention.

As shown in FIGS. 1A and 1B, the preferred embodiment of handrail 10 has lower rail 20 sliding in a telescoping manner within upper rail 18. Lower rail 20 therefore has a smaller outer diameter than does upper rail 18. In addition, lower rail 20 contains optional spacers or bearings 56 and 58 that are tubular and fit around lower rail 20. Spacers 56 and 58 provide a snug, evenly spaced fit between lower rail 20 and upper rail 18 during extension and retraction of handrail 10. They also provide for smooth (i.e., low friction) extension and retraction of handrail 10. Spacers 56 and 58 may be made of any suitable material such as plastic and are strongly secured to lower rail 20 by any suitable method. For example, spacers 56 and 58 may be cut from lengths of polyvinyl chloride (PVC) pipe and glued in place. Spacer 58 is preferably located directly adjacent to top end 26. Spacer 58 may also be located within a few inches of top end 26. Spacer 56 is separated from spacer 58 by a distance 61 such as twelve inches. Both spacers 56 and 58 are located so that when handrail 10 is in its extended position, the portion of lower rail 20 containing spacers 56 and 58 remains inside upper rail 18. That is, spacers 56 and 58 remain inside upper rail 20 at all times. While FIG. 3 illustrates two spacers, it is to be understood that any number of spacers may be used. Of course, if upper rail 18 instead slides within lower rail 20, then spacers are instead secured around upper rail 18.

Note that while it is preferred that both upper rail 18 and lower rail 20 are made of tubular materials, it is not required. Tubular materials are in general less expensive and easier to machine. However, only the rail that is serving as the outer rail, upper rail 18 in the preferred embodiment, must be tubular. The other rail, lower rail 20 in the preferred embodiment, may be solid. Furthermore, only the length of the outer rail in which the inner rail travels must be tubular. The remainder of the outer rail may be solid.

Typical dimensions of upper rail 18 are a total length (i.e., before bend 30 is created) of between two and five feet, such as 28, 42, or 48 inches. A typical outer diameter is 1¼ inches with a wall thickness of 0.065 inch. The radius of curvature of bend 30 may be approximately three inches. Typical dimensions of lower rail 20 are between two and three feet, such as thirty inches. A typical outer diameter of lower rail 20 is one inch with a wall thickness of 0.065 inch. Spacers 56 and 58 are typically separated by about twelve inches.

While these are preferred dimensions, any suitable dimensions are within the scope of the present invention. It may be desirable to manufacture the handrail in varying lengths to accommodate different heights of users, or to manufacture custom handrails according to a user's specifications. The handrail may be treated with special coatings, such as a rustprevention coating, if desired.

The location on wall 12 at which upper rail 18 is pivotally attached, i.e., the value of distance 36, may vary as desired. Motor homes often have a grab handle adjacent to the door. If an existing motor home is being retrofitted with handrail 10, then the grab handle can be removed and replaced with a bracket for pivotally mounting upper rail 18. In this case, the bracket can be mounted at the height of either the top or bottom (or an intermediate location) of the replaced grab handle. Upper rails of lengths 48 or 42 inches, respectively, have been found to work particularly well with such bracket placement. Alternatively, upper rail 18 can be pivotally attached below the existing grab handle. In this case, and upper rail length of 28 inches has been found to work particularly well.

Figure 4:
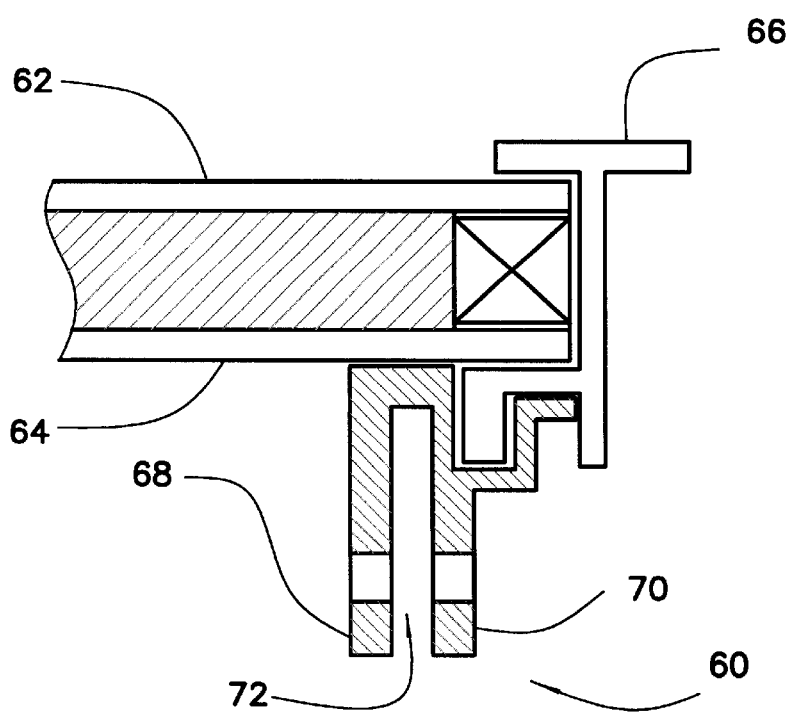
FIG. 4 illustrates schematically one embodiment of an upper bracket of the present invention mounted to an RV.

Any suitable upper bracket may be used to pivotally attach wall end 22 of upper rail 18 to wall 12. A preferred bracket 60 of the present invention is illustrated schematically in FIG. 4 and in more detail in FIGS. 5A–5D, which show left plan, right plan, front plan, and top plan views, respectively. Bracket 60 is designed specifically to attach to existing vehicles without requiring any changes to the door or door jamb. Bracket 60 may be made of any suitable material; for example, it may be cast aluminum. FIG. 4 is a top sectional view of an RV wall to which top bracket 60 has been attached. Shown are an interior RV wall panel 62, an exterior RV skin 64, and a typical door jamb 66. Bracket 60 fits around door jamb 66 as shown. Bracket 60 contains two leaves, a left leaf 68 and a right leaf 70, that create a slot 72. Region 50 of endpiece 42 (FIG. 2B) is inserted into slot 72 and secured with a bolt that passes through hole 52 and through holes in each of left leaf 68 and right leaf 70. This connection creates the pivotal motion required for operation of handrail 10.

Turning now to FIGS. 5A–5D, FIG. 5A shows the left side of bracket 60. Left leaf 68 contains a hole 74 through which a bolt is passed to pivotally secure endpiece 42 to bracket 60. Also shown are two holes 76 and 78 through which bolts are inserted to attach bracket 60 to the outer wall of the RV. Note that the left side of left leaf 68 is preferably flush with the left side of the entire bracket 60. FIG. 5B is a right view of bracket 60, showing the right side of right leaf 70. The bolt passing through hole 74 and endpiece 42 also passes through a hole 80 in right leaf 70. Bolts are also inserted through holes 82 and 84 to secure bracket 60 to door jamb 66. Note that the right side of right leaf 70 is not flush with the right side of the entire bracket, to accommodate door jamb 66. FIG. 5C is a front view of bracket 60 showing the locations of left leaf 68, right leaf 70, slot 72, and holes 76, 78, 82, and 84. FIG. 5D is a top view of bracket 60 showing left leaf 68, right leaf 70, slot 72, and holes 74, 80, 78, and 84. A portion 85 of bracket 60 fits around door jamb 66 as shown in FIG. 4, allowing mounting screws to penetrate the door framing member and provide an extremely secure attachment of bracket 60 to wall 12.

Figure 6A:
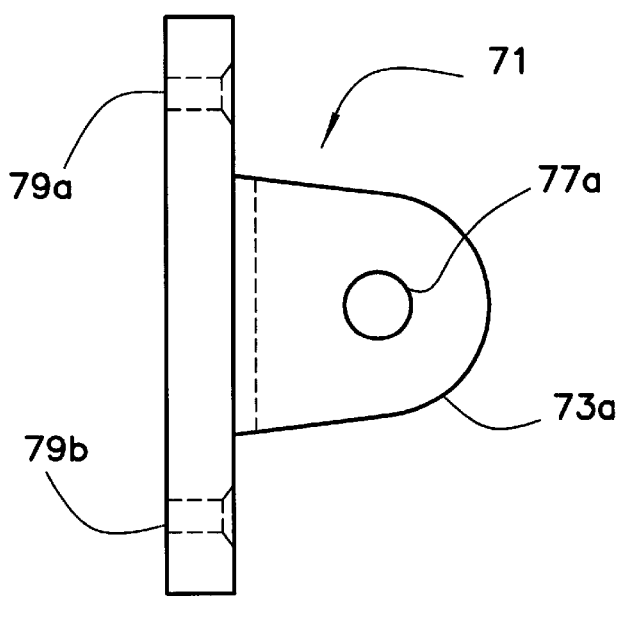
FIGS. 6A–6B are left and front plan views, respectively, of an alternative embodiment of an upper bracket of the present invention.
Figure 6B:
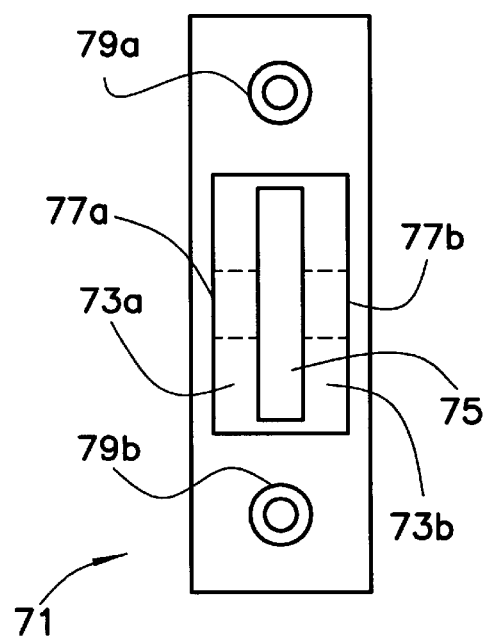

An alternative embodiment of an upper bracket 71 is shown in FIGS. 6A and 6B, left and front plan views, respectively. Upper bracket 71 mounts flat on RV outer wall 12 and is used when the RV door jamb is of a different style than door jamb 66. Bracket 71 may be made of any suitable material; for example, it may be cast aluminum. Bracket 71 contains two symmetric leaves 73a and 73b that define a slot 75 into which region 50 of endpiece 42 (FIG. 2B) is inserted. A bolt passes through hole 52 and through holes 77a and 77b in leaves 73a and 73b to create the pivotal connection required for operation of handrail 10. Bracket 71 can be mounted to the RV wall with screws passing through holes 79a and 79b and into either the wall itself or sex bolts that pass through the entire wall thickness, exposing their heads on the interior wall surface.

Figure 7:
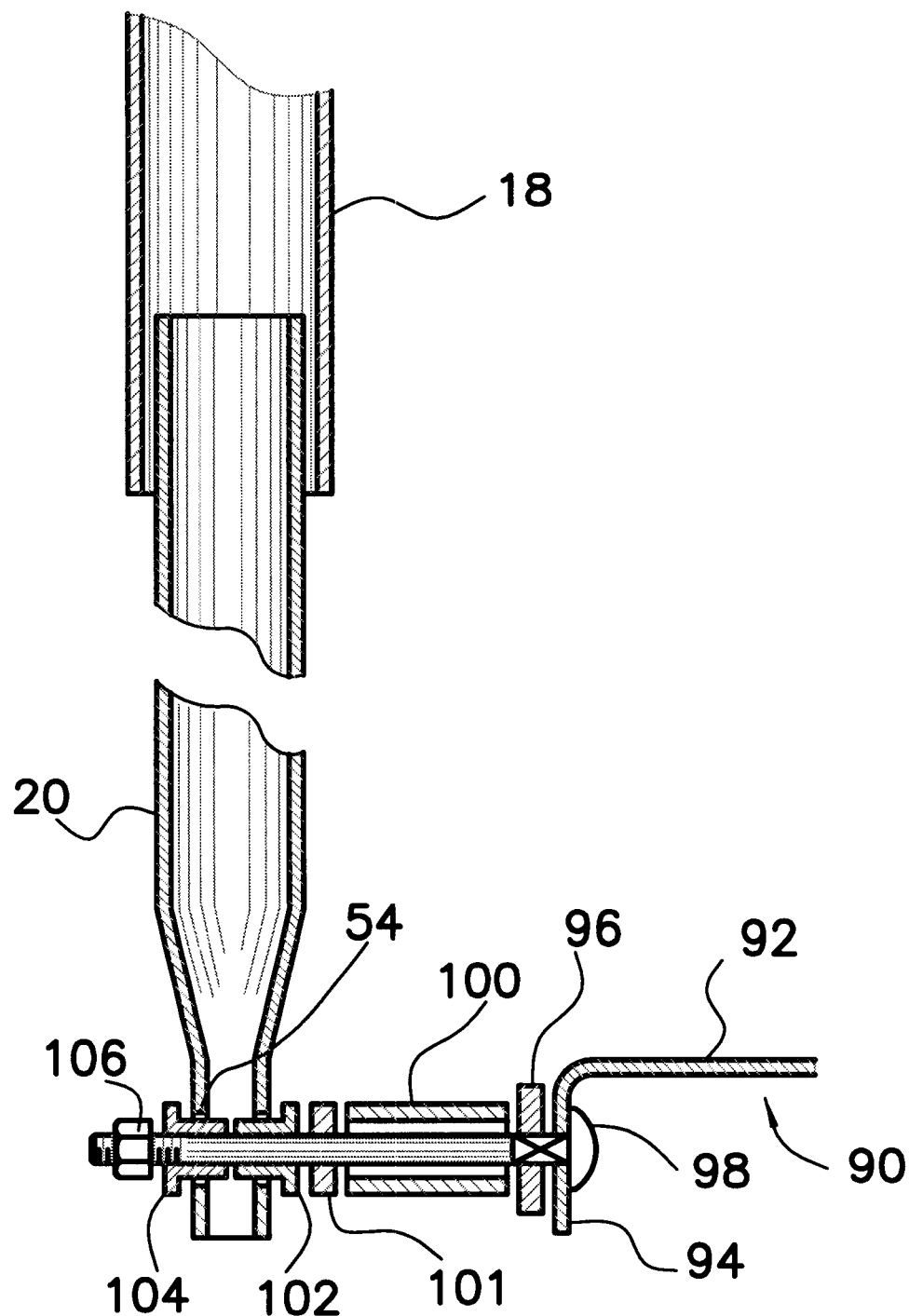
FIG. 7 is a cross-sectional view of the side mount embodiment of the lower bracket of the present invention.

Any suitable lower bracket may be used to pivotally attach step end 28 of lower rail 20 to stairs 16. The lower bracket must also extend the attachment point beyond the front of the stairs to ensure that handrail 10 does not contact the RV wall during retraction. The present invention provides two lower bracket embodiments: a side mount embodiment and a tread mount embodiment. The side mount embodiment is generally preferred; however, some RV steps have a slot in the side that is necessary for operation of the stairs, and the side mount embodiment would interfere with such operation. In this case, the tread mount embodiment is employed. The side mount embodiment is illustrated in FIG. 7, along with upper rail 18 and lower rail 20. Also shown in cross section is an RV step 90. Typically, RV step 90, which is the lowest step of the stairs, contains a tread portion 92, a side lip 94, and a front lip (not shown). The front lip extends down from tread 92 in a manner similar to the one in which side lip 94 extends down. A side mount bracket 96, shown in FIG. 8, extends forward from side lip 94, with its front end 114 directed toward the front of the stairs. The edge of front end 114 of side mount bracket 96 is visible in FIG. 7. A carriage bolt 98 extends through bracket 96, a spacer 100, a jam nut 101, and two bearings 102 and 104 that are inserted into hole 54 of lower rail 20. Carriage bolt 98 is then secured with a lock nut 106 that preferably contains a nylon insert. Spacer 100 is shown in perspective view in FIG. 9. Spacer 100 determines how far away from the stairs lower rail 20 is positioned, and may be of any length needed to provide vertical alignment between wall end 22 of upper rail 18 and step end 28 of lower rail 20. A suitable length is 1¾ inches. Bearings 102 and 104, illustrated in FIG. 10, are preferably bronze and extend fully into hole 54 of lower rail 20. Bearings 102 and 104 provide smooth pivoting of lower rail 20 with respect to carriage bolt 98.

Referring again to FIG. 8, side mount bracket 96 contains three holes 108, 110, and 112. Holes 108 and 110 fit carriage bolts that secure side mount bracket 96 to side lip 94 of step 90. Carriage bolt 98 is inserted through hole 112. Side mount bracket 96 serves simply to extend the position of bolt 98 beyond the front of step 90, thus ensuring that lower rail 20 does not contact the wall of the RV when handrail 10 is in its retracted position. Side mount bracket 96 may be made of a flat steel bar. A typical length of side mount bracket 96 is between five and seven inches. Front end 114 of side mount bracket 96 is preferably rounded and smooth, so that any inadvertent contact with side mount bracket 96 by a user is relatively safe.

Figure 11:
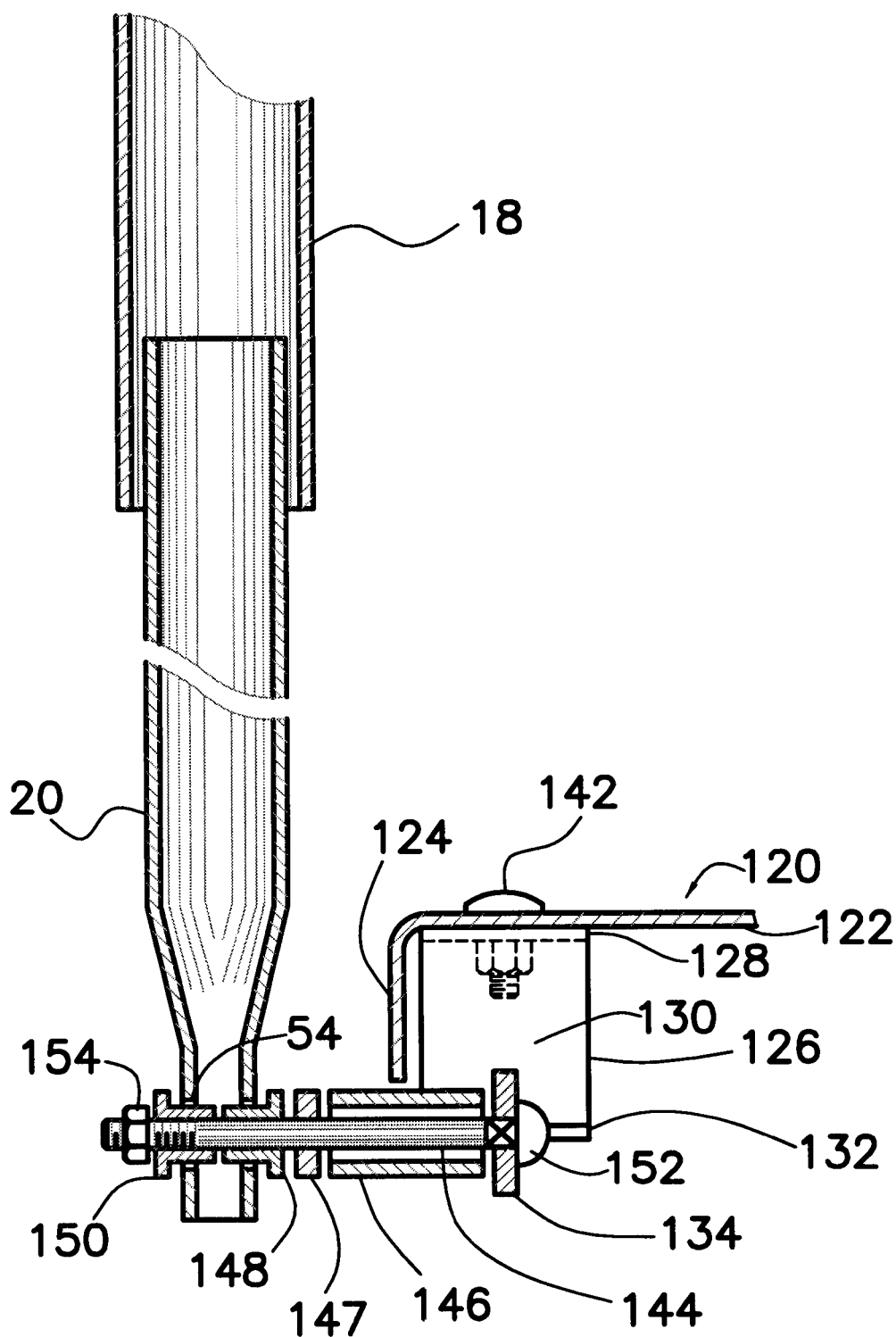
FIG. 11 is a cross-sectional view of the tread mount embodiment of the lower bracket of the present invention.
Figure 12:
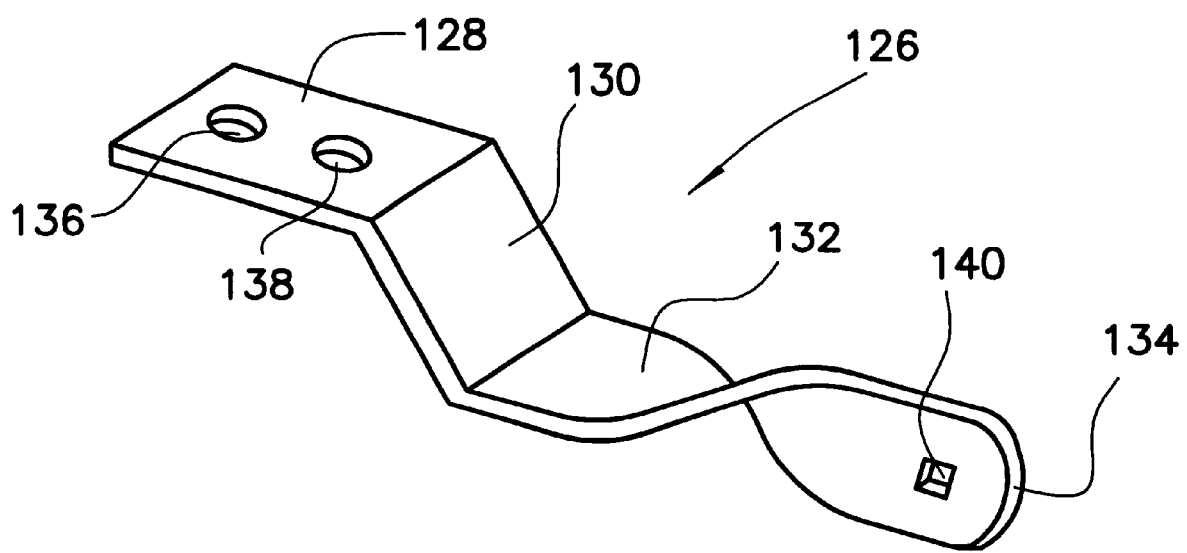
FIG. 12 is a side perspective view of the tread mount bracket of the present invention.

The tread mount embodiment of the lower bracket is illustrated in FIG. 11, along with upper rail 18 and lower rail 20. In the tread mount embodiment, the lower bracket is attached to the bottom of the lowest step of the stairs. Also shown in cross section is an RV step 120. Typically, RV step 120, which is the lowest step of the stairs, contains a tread portion 122, a side lip 124, and a front lip (not shown). The front lip extends down from tread 122 in a manner similar to the one in which side lip 124 extends down. A tread mount bracket 126, shown in FIG. 12, extends from tread 122. Tread mount bracket 126 contains a tread portion 128, a sloped portion 130, a twisted portion 132, and a front edge 134. Each portion is labeled in FIG. 11. Tread mount bracket 126 serves a similar purpose as side mount bracket 96: it pivotally secures lower rail 20 to step 120 and extends the point of securing away from the RV. Tread mount bracket 126 can be made of a flat steel bar. Bolts 142 inserted through holes 136 and 138 secure tread mount bracket 126 to tread 122.

Referring again to FIG. 11, a carriage bolt 144 is inserted through a hole 140 in tread mount bracket 126, and then through a spacer 146, a jam nut 147, and two bearings 148 and 150. Bearings 148 and 150 are preferably bronze and are inserted into hole 54 of lower rail 20. As in the side mount embodiment, bearings 148 and 150 provide for smooth rotation of lower rail 20 with respect to carriage bolt 144. Bolt 144 is secured by lock nuts 152 and 154. Lock nut 154 preferably also contains a nylon insert. Spacer 146 is similar to spacer 100 of FIG. 9, but is typically longer, such as 2½ inches, in order to provide vertical alignment between wall end 22 of upper rail 18 and step end 28 of lower rail 20.

It will be clear to one skilled in the art that the above embodiment may be altered in many ways without departing from the scope of the invention. For example, different upper and lower brackets may be used to pivotally secure handrail 10 to the vehicle. Handrail 10 may be advantageously manufactured from newly developed materials that are strong, lightweight, easy to machine, and attractive. Comfortable hand grips may be added to the outside surface of upper rail 18. Accordingly, the scope of the invention should be determined by the following claims and their legal equivalents.

What is claimed is:

1. A retractable handrail comprising:
   a) an extended upper rail having a wall end and a bottom end, said wall end being pivotally attached to an outer wall of a recreational vehicle adjacent to a door, said extended upper rail comprising a bend having an obtuse angle of approximately 150°, said bend being disposed near said wall end of said extended upper rail; and
   b) an extended lower rail having a top end and a step end pivotally attached to retractable stairs, said top end being telescopingly engaged with said bottom end of said upper rail;
       whereby extension of said stairs causes extension of said handrail, and retraction of said stairs causes retraction of said retractable handrail.

2. The retractable handrail of claim 1 wherein said step end of said lower rail and said wall end of said upper rail are in substantial vertical alignment when said retractable handrail is attached to said vehicle and in a retracted position.

3. The retractable handrail of claim 1 wherein said upper rail has a length of between two and five feet.

4. The retractable handrail of claim 1 wherein said lower rail has a length of between two and three feet.

5. The retractable handrail of claim 1 wherein said upper rail is tubular and said lower rail is telescopingly engaged within said upper rail.

6. The retractable handrail of claim 5, further comprising at least one spacer secured around said lower rail near said top end that remains within said upper rail during extension and retraction of said handrail.

7. The retractable handrail of claim 1 wherein said lower rail is tubular and said upper rail is telescopingly engaged within said lower rail.

8. The retractable handrail of claim 1 wherein said upper rail has a circular cross section.

9. The retractable handrail of claim 1 wherein said lower rail has a circular cross section.

10. The retractable handrail of claim 1, further comprising means for pivotally attaching said wall end of said upper rail to said outer wall of said recreational vehicle.

11. The retractable handrail of claim 10 wherein said means for pivotally attaching said wall end comprises an upper bracket pivotally attached to said wall end of said upper rail.

12. The retractable handrail of claim 1, further comprising means for pivotally attaching said step end of said lower rail to said stairs of said recreational vehicle.

13. The retractable handrail of claim 12 wherein said means for pivotally attaching said step end comprises a lower bracket pivotally attached to said step end of said lower rail.

14. The retractable handrail of claim 13 wherein said lower bracket comprises means for fixing said lower bracket to a lowest step of said stairs.

15. The retractable handrail of claim 13 wherein said lower bracket comprises means for fixing said lower bracket to a side of said stairs.

16. The retractable handrail of claim 13 wherein said lower bracket comprises means for fixing said lower bracket to a bottom of said stairs.

17. The retractable handrail of claim 1 wherein said retractable handrail is made of metal.

18. The retractable handrail of claim 17 wherein said retractable handrail is made of steel.

19. The retractable handrail of claim 1 wherein said retractable handrail extends at most six inches from said outer wall when said retractable handrail is attached to said vehicle and in a retracted position.

* * * * *